Patented Dec. 25, 1928.

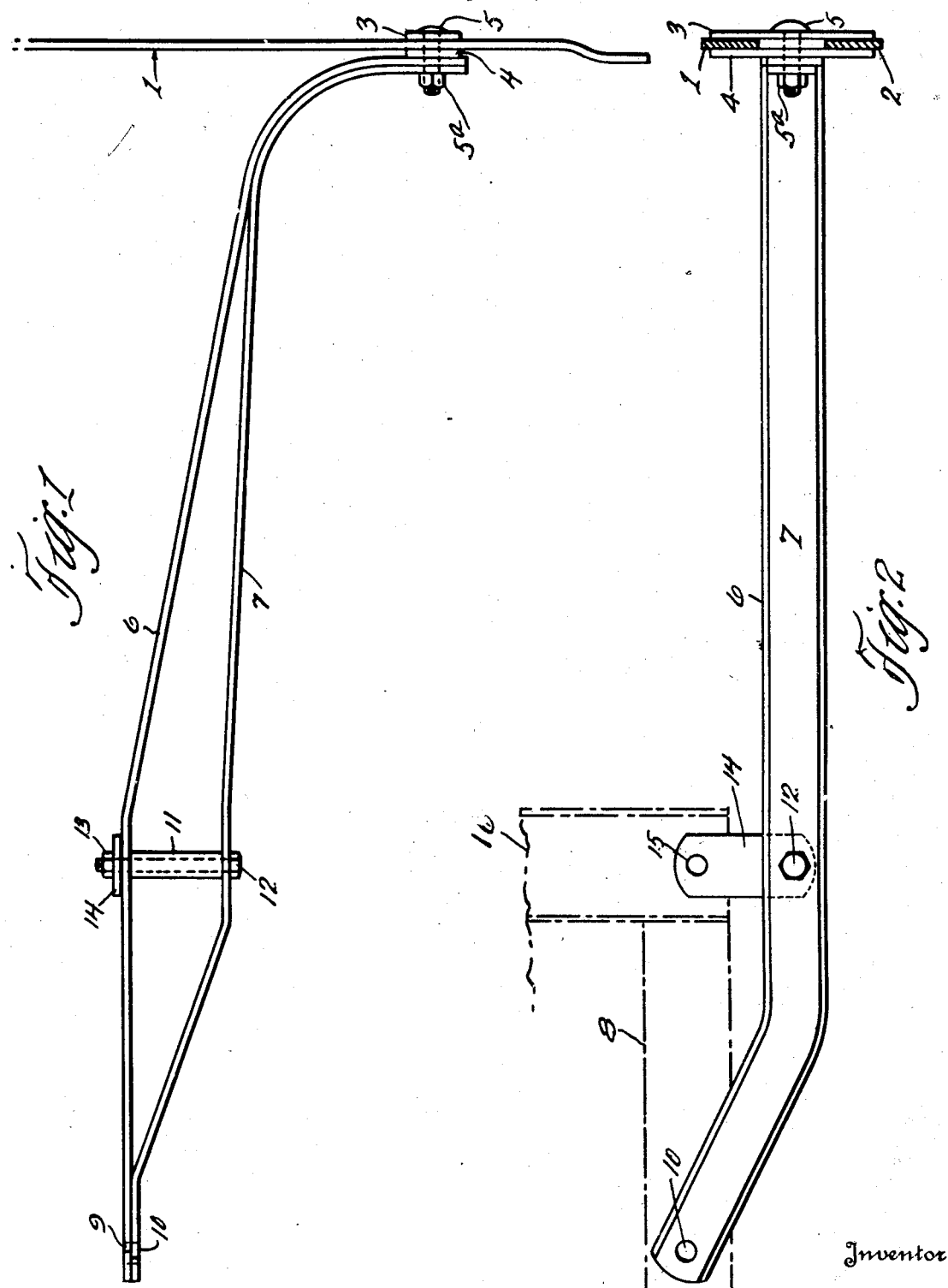

1,696,884

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

BUMPER SUPPORT.

Application filed April 6, 1927. Serial No. 181,431.

This invention relates to vehicle bumpers and more particularly to the provision of means for supporting the impact element of the bumper at a considerable distance from the point of attachment of the supporting means to the vehicle frame. A further object is to provide a support which will react resiliently to a blow struck upon the impact members but which is at the same time sufficiently rigid to prevent vibration of the extended arms.

Further objects will be apparent from the following description and the drawings and from a use of the combination of elements set forth in the appended claims.

In the drawings Fig. 1 represents a plan view of the support arm and Fig. 2 is a side elevation of the device shown in Fig. 1.

The bumper is shown and described as attached to the front of the vehicle and the terms "forward" and "rear" will be used in reference to such attachment although it is not intended in so doing to restrict the use of the bumper to any particular position on the vehicle.

Referring to the reference characters used in the drawings, 1 denotes a bar of an impact member which may be made up of two spring steel bars, 1 and 2, spaced apart vertically and held in such relative spaced positions by means of the clamp plates 3 and 4 which are adapted respectively to bear upon the front and rear surfaces of the impact bars and which may be drawn toward each other by means of the bolt 5 passing through holes therein.

The impact members are shown supported from the car by means of a main bar 6 and an auxiliary bar 7. The bar 6 is curved outwardly at its forward end for attachment to the impact element and is bent upwardly at its rear end for attachment to the longitudinal vehicle frame member 8, through the bolt hole 9. The bar 7 is bent outwardly at its forward end to conform to the inner surface of the curved portion of the bar 6 and the two bars are connected to each other and to the clamp plate 4 by means of the bolt 5 passing through the holes in the end portions of the bars 6 and 7. By tightening the nut 5ª the impact bars and support arms are rigidly connected to each other. The rear end of the bar 7 is bent upwardly and adapted to lie adjacent to the rear end portion of the bar 6 and has a hole 10 therein which registers with the hole 9 by which the bar 6 is attached to the frame member 8. The two bars are fastened to the frame member 8 by means of a bolt (not shown) passing through the holes 9 and 10 and a suitable hole in the said frame member.

The bars 6 and 7 are so bent that the portions intermediate their ends are spaced apart laterally and are held in such spaced position by means of a spacer 11, a bolt 12 passing through the spacer 11 and holes in the bars 6 and 7, and a nut 13 on the bolt 12.

The support arms are also supported by means of a plate 14, having a hole at its lower end through which the bolt 12 may pass, from the vehicle frame at a point spaced forwardly from the point of attachment of the rear end portions of the arms. The plate 14 is shown as adapted to be attached, by means of a bolt (not shown) through the hole 15, to the vehicle frame at a point within the channel shaped member 16 which is adapted to support the vehicle fender (not shown). Other suitable points of support for the plate 14 may be used, the one shown being used only because of its convenient location.

It is apparent that other types of impact members may be used with my invention or that other means for connecting the support arms to the impact members and the vehicle may be adopted and it is not intended that the scope of the invention should be limited by the particular embodiments herein shown.

The truss structure embodied in this fitting affords greater stability and rigidity to the support and thereby prevents horizontal vibration or "shimmying" of the bumper structure when mounted on the car. The device is especially adapted for use where the impact element must be supported at a considerable distance from the point of attachment of the support arm to the vehicle but it may be used advantageously where such great spacing is not essential.

Having thus described my invention, what I claim is:

1. A bumper support including bars held adjacent each other at their outer ends and spaced apart intermediate their ends, and means for holding such intermediate portions in proper spaced relation.

2. A bumper support including bars held adjacent each other at their inner ends and spaced apart intermediate their ends, and means for holding said intermediate portions in proper spaced relation.

3. A bumper support including bars adjacent each other at their end portions and spaced from each other at their intermediate portions, and means for holding such intermediate portions in proper spaced relation.

4. A vehicle bumper including an impact element, support arms in contact and curved outwardly at their forward ends for attachment to said impact element and having the portions intermediate their ends spaced apart, and means for holding such intermediate portions in proper spaced relation.

5. A vehicle bumper including an impact element, resilient support arms adapted to be held adjacent each other at their ends and to be attached to the vehicle at one end and to the impact element at the other, such arms being spaced apart at the portions intermediate their ends, and means for holding such intermediate portions in proper spaced relation.

6. A bumper support including two bars set on edge and held adjacent each other at their end portions, said bars having the portions intermediate their ends spaced apart horizontally, and means for holding said intermediate portions in proper spaced relation.

7. A bumper support including resilient bars set on edge and held adjacent each other at their end portions, said bars being spaced apart horizontally at their intermediate portions and bent upwardly at their rear end portion for attachment to a vehicle, and means for holding such intermediate portions in proper spaced relation.

8. A bumper support including bars adjacent each other at their inner ends and spaced from each other at their intermediate portions, means for holding such intermediate portions in proper spaced relation and means for attaching the bars to the vehicle at points unequally spaced from the rear ends of the bars.

9. In a bumper support, the combination of bars, adjacent each other at their inner ends and spaced from each other at their intermediate portions, means for holding such intermediate portions in proper spaced relation, means for attaching the inner end portions of the bars to the vehicle, and means connected to the intermediate portion of one of the bars for attaching the support to the vehicle.

10. In a bumper support the combination of bars adjacent each other at their end portions and spaced from each other at their intermediate portions, means for attaching said support to the vehicle at the point of maximum spacing of the bars and from the inner end portions of the bars.

11. In a bumper support the combination of bars adjacent each other at their end portions and spaced from each other at their intermediate portions, means for holding said intermediate portions in proper spaced relation, and means for attaching said support to the vehicle from the inner end portions of the bars and from the point of maximum spacing of the bars.

12. The combination, with a vehicle frame, of a bumper impact element, support arms connected at their outer ends to said impact element and at their inner ends to the vehicle frame, means separate from said frame for bracing the support arms against lateral movement and means for suspending the support arms at a point intermediate their ends.

13. A bumper support comprising bars held adjacent each other at an end portion and spaced apart intermediate their ends, means for holding said intermediate portions in proper spaced relation, and means for connecting the support bars to a vehicle at a point intermediate their ends.

14. A bumper support comprising bars held adjacent each other at an end portion and spaced apart intermediate their ends, means for holding said intermediate portions in proper spaced relation and means for connecting said support bars to a vehicle at longitudinally spaced points.

15. A bumper support including bars adjacent each other throughout separate portions of their length and spaced apart intermediate said portions, and means for bracing said spaced portions.

16. A bumper support including bars adjacent each other throughout separate portions of their length and spaced apart intermediate said portions, and means for bracing said spaced portions, said means including a spacer between said bars and means for drawing said bars toward each other.

In testimony whereof, I hereunto affix my signature.

HERBERT S. JANDUS.